United States Patent
Forbes et al.

(10) Patent No.: US 8,197,075 B2
(45) Date of Patent: Jun. 12, 2012

(54) REAR VIEW MIRROR WITH FACET CONTAINING SELECTIVE ACCEPTANCE LAYER

(75) Inventors: James Wendell Forbes, Farmington Hills, MI (US); Alexander Petniunas, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 12/823,724

(22) Filed: Jun. 25, 2010

(65) Prior Publication Data

US 2010/0259843 A1    Oct. 14, 2010

Related U.S. Application Data

(62) Division of application No. 12/259,713, filed on Oct. 28, 2008, now abandoned.

(51) Int. Cl.
*G02B 5/08* (2006.01)
*G02B 7/182* (2006.01)
*B60R 1/06* (2006.01)

(52) U.S. Cl. ............... 359/838; 359/883; 359/884
(58) Field of Classification Search .......... 359/838, 359/839, 851, 866, 883, 884
See application file for complete search history.

(56) References Cited

U.S. PATENT DOCUMENTS

| | | | |
|---|---|---|---|
| 1,925,666 A | 9/1933 | Kerns | |
| 2,514,989 A | 7/1950 | Buren | |
| 2,622,482 A * | 12/1952 | Balkin | 359/720 |
| 2,881,655 A | 4/1959 | Eisenschink | |
| 3,628,851 A | 12/1971 | Robertson | |
| 3,806,232 A * | 4/1974 | Gray | 359/851 |
| 4,023,029 A | 5/1977 | Fischer | |
| 4,040,727 A * | 8/1977 | Ketchpel | 349/114 |
| 4,482,210 A | 11/1984 | Brookman | |
| 4,730,926 A | 3/1988 | Wedemeyer | |
| 4,859,046 A | 8/1989 | Traynor et al. | |
| 4,906,085 A * | 3/1990 | Sugihara et al. | 359/839 |
| 5,005,797 A | 4/1991 | Maekawa et al. | |
| 5,022,747 A | 6/1991 | Polanyi et al. | |
| 5,050,977 A * | 9/1991 | Platzer, Jr. | 359/866 |
| 5,097,362 A | 3/1992 | Lynas | |
| 5,113,292 A * | 5/1992 | Simson | 359/851 |
| 5,122,910 A | 6/1992 | Polanyi et al. | |
| 5,450,246 A | 9/1995 | Jain | |
| 5,500,773 A | 3/1996 | Easter | |
| 5,579,133 A | 11/1996 | Black et al. | |

(Continued)

FOREIGN PATENT DOCUMENTS

DE    2507708 A1    9/1976

(Continued)

*Primary Examiner* — Ricky D Shafer
(74) *Attorney, Agent, or Firm* — Greg P. Brown; Brooks Kushman P.C.

(57) ABSTRACT

A rear view mirror assembly is disclosed in which the mirror has a viewing section and an alignment section meeting to form a reflex angle. The alignment section is etched with a targeting image: a cross-hair or the side surface of the vehicle. When the targeting image is aligned with appropriate feature on the side of the vehicle, the reflex angle is such that the mirror is properly aligned. Also disclosed is a mirror assembly having viewing section and an alignment section with a clear protective outer layer a selective acceptance layer below the clear protective outer layer, and a colored substrate below the selective layer. When the vehicle operator can see the colored substrate through the selective acceptance layer, which transmits only normal light, the mirror is properly aligned.

1 Claim, 7 Drawing Sheets

U.S. PATENT DOCUMENTS

| | | | |
|---|---|---|---|
| 5,642,238 A * | 6/1997 | Sala | 359/871 |
| 5,805,367 A | 9/1998 | Kanazawa | |
| 5,847,889 A * | 12/1998 | Komiyama et al. | 359/851 |
| 5,917,666 A | 6/1999 | Kimble | |
| 6,357,880 B2 * | 3/2002 | Epstein et al. | 359/606 |
| 6,390,632 B1 * | 5/2002 | Palathingal | 359/850 |
| 6,485,151 B2 | 11/2002 | Coleburn | |
| 6,717,712 B2 | 4/2004 | Lynam et al. | |
| 7,167,294 B2 | 1/2007 | Lynam et al. | |
| 7,379,243 B2 * | 5/2008 | Horsten et al. | 359/320 |
| 2002/0041442 A1 | 4/2002 | Witt | |
| 2004/0120056 A1 | 6/2004 | Goolsby | |
| 2007/0030582 A1 | 2/2007 | Schnidt | |

FOREIGN PATENT DOCUMENTS

| | | | |
|---|---|---|---|
| GB | 2048189 | * | 12/1980 |
| GB | 2261861 A | | 6/1993 |
| JP | 55036112 A | | 3/1980 |
| JP | 2003327046 A | | 11/2003 |

* cited by examiner

Prior Art

REAR VIEW MIRROR WITH FACET CONTAINING SELECTIVE ACCEPTANCE LAYER

CROSS-REFERENCE TO RELATED APPLICATIONS

This application is a division of U.S. application Ser. No. 12/259,713 filed Oct. 28, 2008, now abandoned, which is hereby incorporated by reference in its entirety.

BACKGROUND

1. Field of the Invention

The present development relates to a rear view mirror that facilitates properly aligning the mirror.

2. Background of the Invention

Mirror systems are provided on automotive vehicles to aid the operator of the vehicle in viewing other vehicles while merging, lane changing, turning, reversing, etc. Mirrors can provide a view of the vehicles and objects in the vicinity of the operator's vehicle. However, the effectiveness of that view depends on proper alignment of the mirrors. It is known in the art, through customer interviews, car clinics, and survey comments that many vehicle operators do not align their mirrors in an orientation which provides the most information to the operator.

Figure 1:
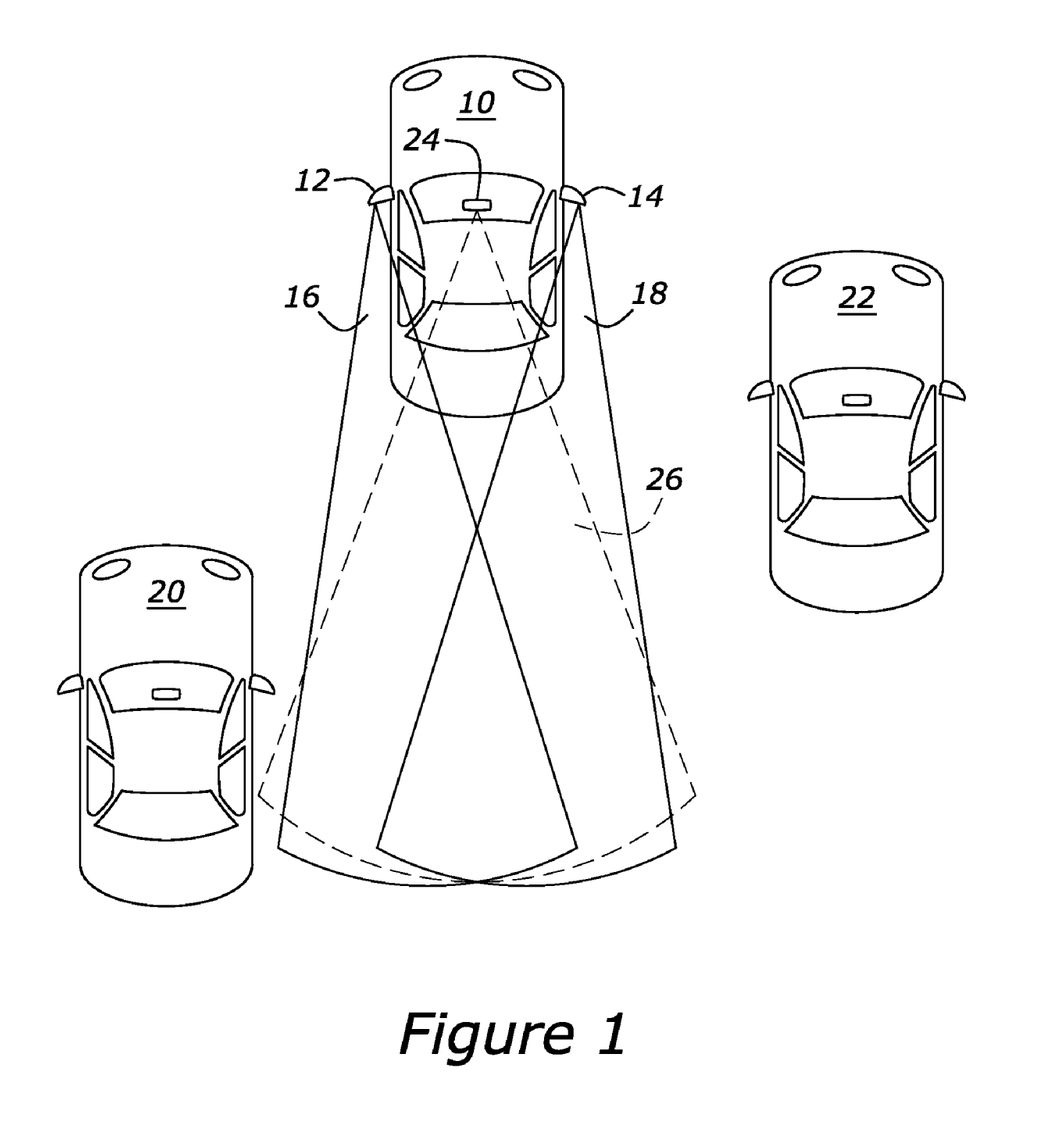
FIG. 1 is a diagrammatic top plan view illustrating improper mirror adjustment, according to the prior art.

In particular, it is common for drivers to position their exterior side mirrors so that they can see the edge of their own vehicle 10. As illustrated in FIG. 1, side mirrors 12 and 14 are adjusted such that their respective viewing regions, shown as 16 and 18, respectively, intersect the back corners of vehicle 10. In this position, the images of vehicles 20 and 22 are not provided to the driver by any of mirrors 12, 14 or in-cabin mirror 24. Also, it can be seen that the viewing angles of mirrors 12, 14, and 24 overlap significantly.

Figure 2:
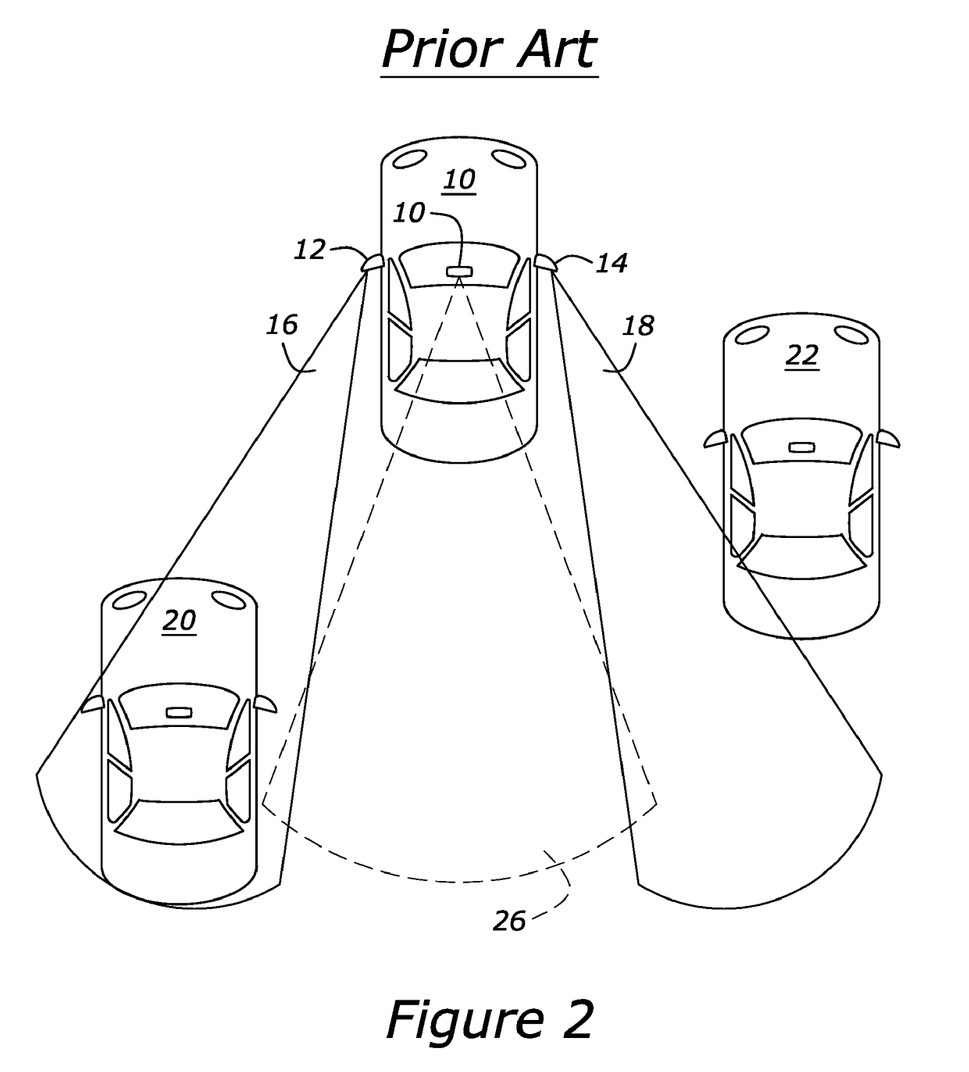
FIG. 2 is a diagrammatic top plan view illustrating proper mirror adjustment, according to the prior art.

Properly adjusted exterior mirrors 12 and 14 are illustrated in FIG. 2. Images of vehicles 20 and 22 are at least partially in one of the viewing regions 16' and 18'. Also, there is less overlap of viewing regions 16' and 18' with region 26. Also note that neither of viewing regions 16' or 18' intersect with vehicle 10, thereby making a more effective use of available image area of mirrors 12, 14, and 24 than that shown in FIG. 1.

Figure 3:
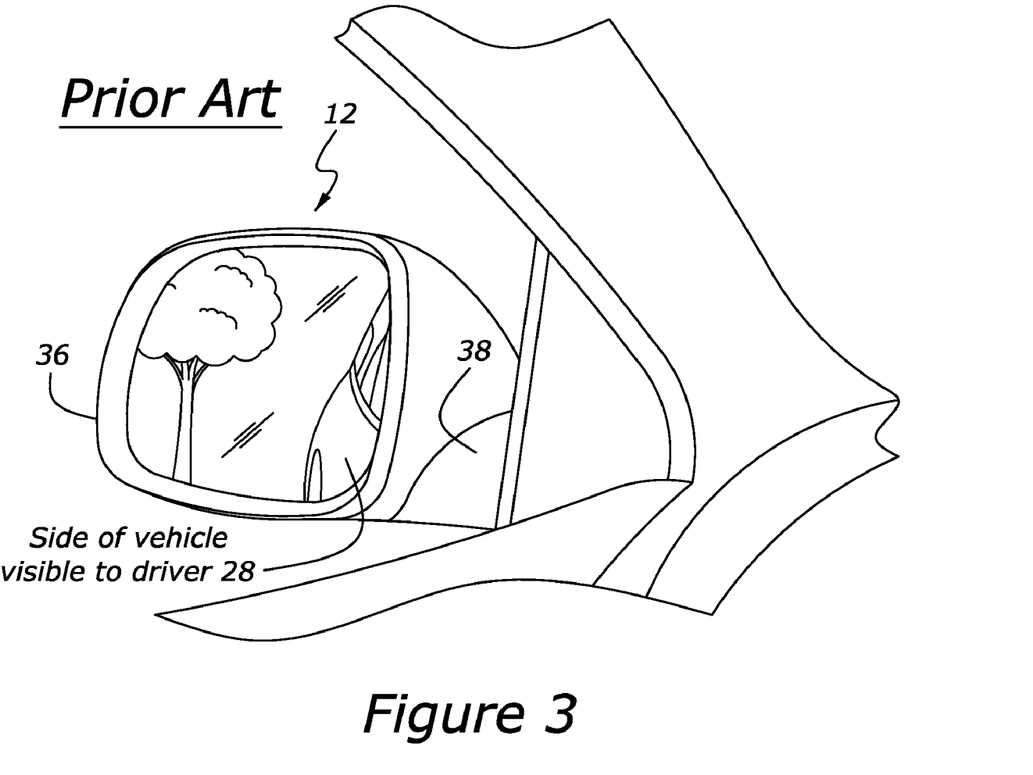
FIG. 3 is a perspective view illustrating how a portion of the vehicle outside edge is shown when a mirror is improperly adjusted, according to the prior art.

One of the advantages of adjusting the mirrors so that viewing region 16 includes a portion of vehicle 10 is shown in FIG. 3. Because the operator can view an image of the side of the vehicle 28 in side mirror 12, it provides the operator an object to view during adjustment of the mirror. However, such a position in FIG. 3 corresponds to the improper adjustment illustrated in FIG. 1. When proper adjustment position such as illustrated in FIG. 2 is used, viewing regions 16' and 18' do not overlap vehicle 10, thereby failing to provide a reference point with which to assess the suitability of the adjustment.

To partially overcome maladjustment of the mirrors by many vehicle operators, some manufacturers provide the vehicle with larger mirrors than would otherwise be required if the mirrors were properly adjusted. Larger mirrors increase weight and aerodynamic drag to the vehicle, both of which penalize fuel economy. Also, the farther the mirrors extend from the vehicle, the greater the likelihood that the vehicle will clip an object in tight conditions such as entering a narrow garage opening or when moving the car close to a booth for collecting a parking ticket or paying a toll.

SUMMARY

A rear view mirror assembly is disclosed which has a mirror coupled to an angle adjusting mechanism. The mirror has a viewing section and an alignment section which meet to form a reflex angle. The alignment section is etched with a targeting image. In one embodiment, the target image is a cross-hair. In another embodiment the image is an outline of the side surface of the vehicle. Typically, the viewing section, the viewing section, is larger than the alignment section, the targeting section. In one example the viewing section exceeds the alignment section by more than a factor of five in cross-sectional area. In one embodiment, the viewing and alignment sections are uninterrupted, but abutting each other, with the line of abutment being generally vertical.

The reflex angle is selected so that the target image of the outline lines up with the side surface of the vehicle from the viewpoint of the vehicle. The viewing section as viewed by the operator provides a desired image which excludes all parts of the vehicle. In one embodiment, the alignment section has lower reflectivity than the viewing section.

Also disclosed is a rear view mirror assembly in which a mirror is coupled to an angle adjusting mechanism. The mirror has a viewing section abutting an alignment section. The two are aligned with respect to other such that an imaginary, infinite plane of the viewing section and an imaginary, infinite plane of the alignment section intersect form an obtuse angle. The viewing section is more than 10 times larger in surface area than the alignment section. The abutting interface is generally vertical, i.e., more vertical then horizontal in orientation. The mirror assembly is coupled to a side of an automotive vehicle with the alignment section proximate the vehicle. The alignment section may have a lower reflectivity than the viewing section. The alignment section is etched with a feature which an operator of the vehicle aligns with a feature of the vehicle to ensure proper mirror adjustment.

In an alternative embodiment, the alignment section has a selective acceptance layer below the clear protective outer layer, and a colored substrate below the selective layer. The selective acceptance layer transmits light rays which are normal to its surface and absorbs non-normal light rays. The obtuse angle is selected so that when the alignment surface is aligned to allow an operator of the vehicle to observe the colored substrate, the viewing section as viewed by the operator provides an image which excludes all parts of the vehicle. The alignment surface is embedded in the viewing surface so that the two top surfaces are flush with each other, or, alternatively, the alignment surface may be applied to the surface of the viewing surface.

One embodiment includes a mirror assembly for a vehicle having an adjustable mounting structure and a mirror having a viewing section and an alignment section. The alignment section has a visual alignment feature that may be viewed to confirm that the viewing section is properly aligned with the adjustable mounting structure.

Also disclosed is a method for providing a mirror assembly for an automotive vehicle. A mirror frame is installed on an outside surface of the vehicle. A mirror adjustment mechanism is installed to the mirror frame. The mirror frame has a mirror mounted in which the mirror has a flat surface with a facet, the facet having an alignment feature to indicate when the mirror is properly aligned.

More drivers will be able to adjust mirrors properly if an affirmative method is provided for determining when the rear view mirror is properly adjusted. Properly adjusted mirrors afford the driver an improved view of the objects in the vehicle's vicinity which reduces or eliminates blind spots.

The cross-sectional area of the mirror may be minimized if the manufacturer can be confident that drivers properly adjust the mirrors. In some cases, manufacturers place larger mirrors on vehicles than strictly necessary, to overcome the problem of maladjusted mirrors giving inappropriate views. With assurance that the viewing angle is adjusted properly, manufacturers would not need to compensate for maladjusted mirrors. The benefits of smaller mirrors are improved fuel economy by reducing the area of cross-section of the vehicle with respect to the direction of travel. Also, rear view mirrors can be a source of wind noise, which would be lessened with smaller mirrors. Finally, mirrors are known to be clipped by encounters with fixed or moving objects. Examples of fixed objects are mail boxes, garage door openings, toll booths, and telephone poles. Any decrease in the size of the mirror can reduce the overall width of the vehicle, which allows for access to tighter places and a reduced chance of hitting the mirror with another object.

Customer satisfaction may be enhanced because a foolproof method is provided for properly adjusting the mirrors.

DETAILED DESCRIPTION OF THE PREFERRED EMBODIMENT(S)

Figure 4:
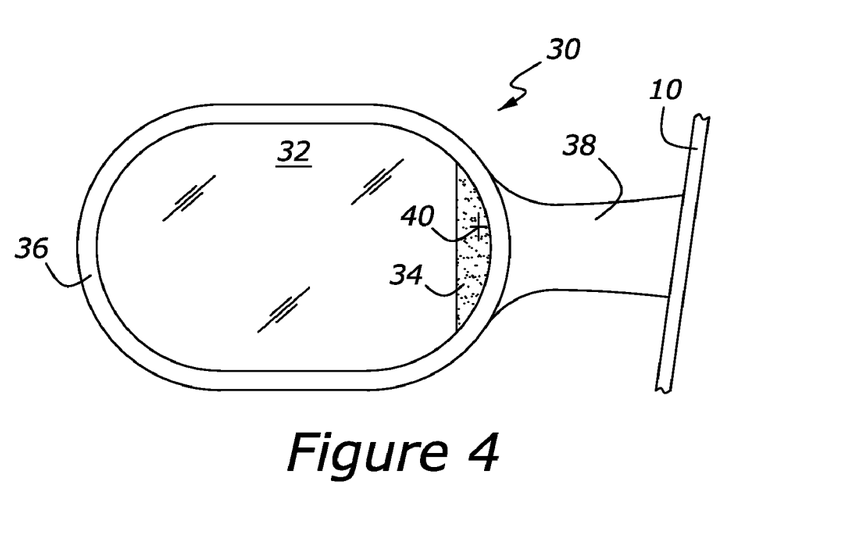
FIG. 4 showing a mirror provided with a facet according to one aspect of the present invention.

Referring to FIG. 4, a mirror assembly 30 having a first surface 32 (alternately called a viewing section) and a second surface 34 (alternately called an alignment section) is shown mounted in housing 36. Housing 36 has an arm 38 for attaching the mirror assembly 30 to vehicle 10. In one embodiment, second surface 34 is less reflective than first surface 32. Second surface 34 is etched with a targeting feature, which in one embodiment is a cross-hair 40 to aid in aligning the mirror assembly 30 properly. In particular, a feature on the car, such as a door handle (not shown), is designated to be the target point for cross-hair 40 to ensure suitable alignment of mirror assembly 30.

Figure 5:
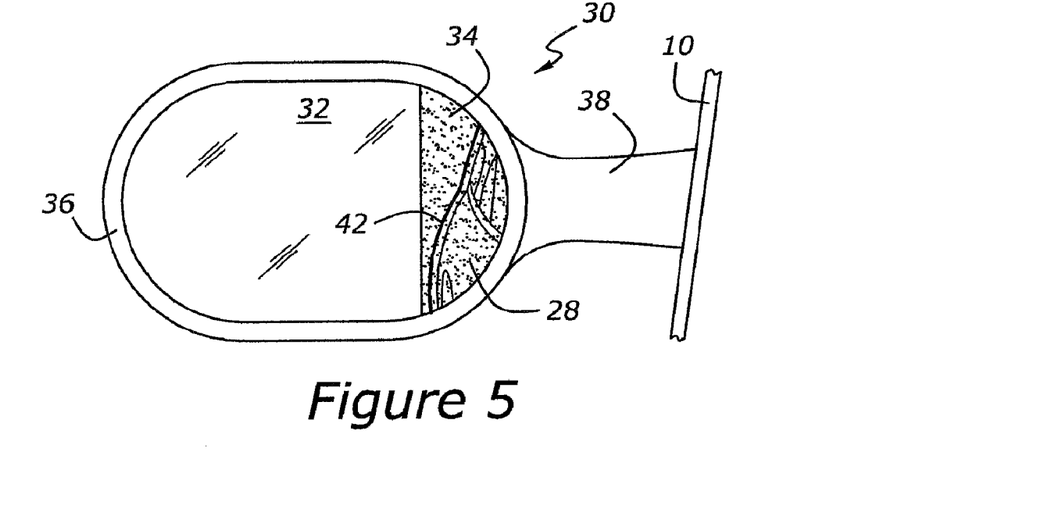
FIG. 5 showing a mirror provided with a facet according to another aspect of the present invention.

Alternatively, in FIG. 5, the targeting feature is a targeting outline 42 for aligning the first surface 32 of mirror assembly 30 is an outline of the outside surface of the vehicle. When, the image of the outside of vehicle 28 aligns with targeting outline 42, the first surface 32 of the mirror assembly 30 is properly aligned. The illustration in FIG. 5 shows targeting outline 42 not quite aligned with the image of the outside of vehicle 28. When the two are lined up, the first surface of mirror assembly 30 provides a suitable rear view to the operator of vehicle 10.

Cross-hair 40 and targeting outline 42 of the outline of vehicle 10 are etched into the glass surface, in one embodiment. However, cross-hair 40 or targeting outline 42 could also be painted or marked on or within the glass in any known manner, in other embodiments.

Figure 6:
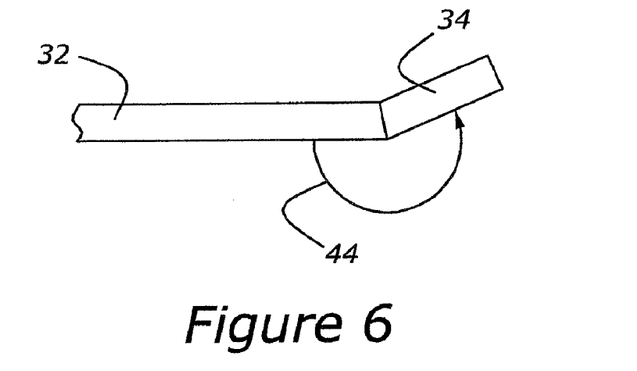
FIG. 6 is a top plan view of the mirror shown in FIG. 5 indicating the reflex angle between the two portions of the mirror.

In FIG. 6, a top view of the first surface 32 and second surface 34 are shown. The front faces of the two surfaces form a reflex angle 44 (greater than 180°).

Figure 7:
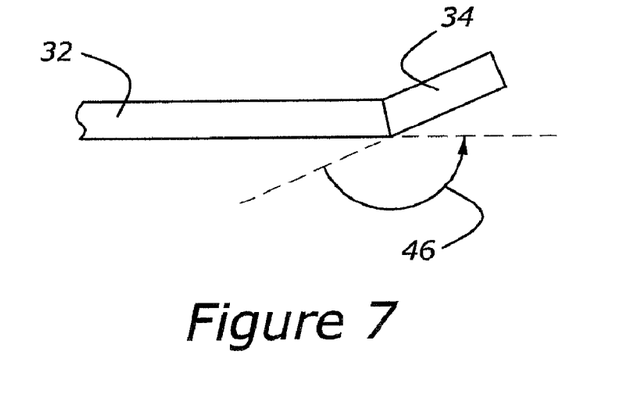
FIG. 7 is a top plan view of the mirror shown in FIG. 5 indicating the obtuse angle between the planes of the two portions of the mirror.

Another way to define the angle is shown in FIG. 7 in which imaginary, infinite planes extending from the faces of first surface 32 and second surface 34 are illustrated. The two planes intersect with forming obtuse angle 46.

Figure 8:
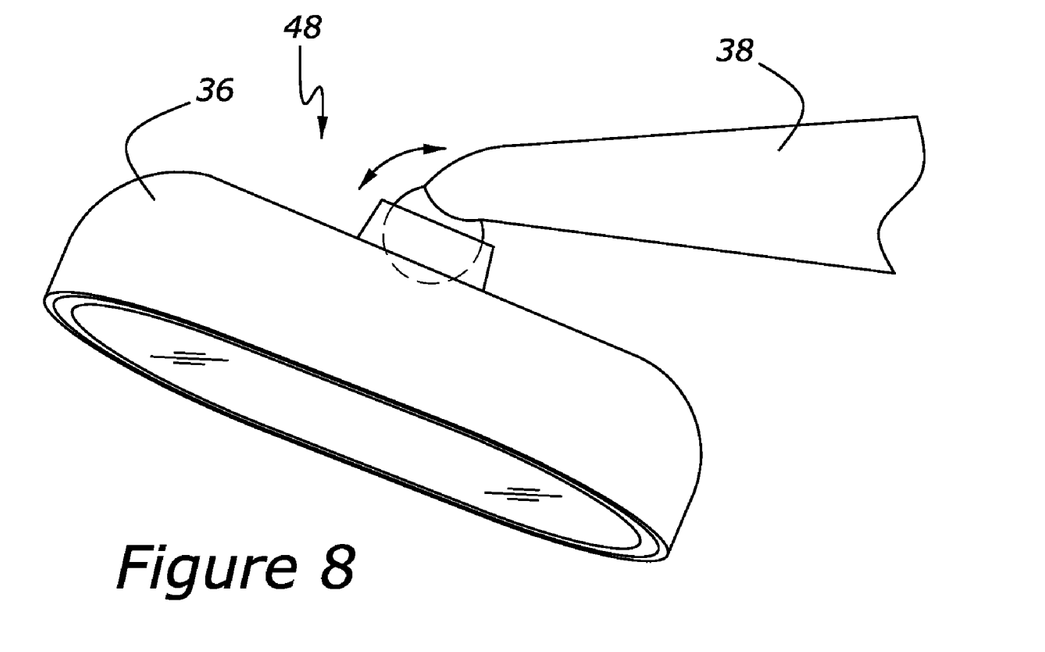
FIGS. 8 and 9 are top plan views that show an adjusting mechanism for a mirror assembly.
Figure 9:
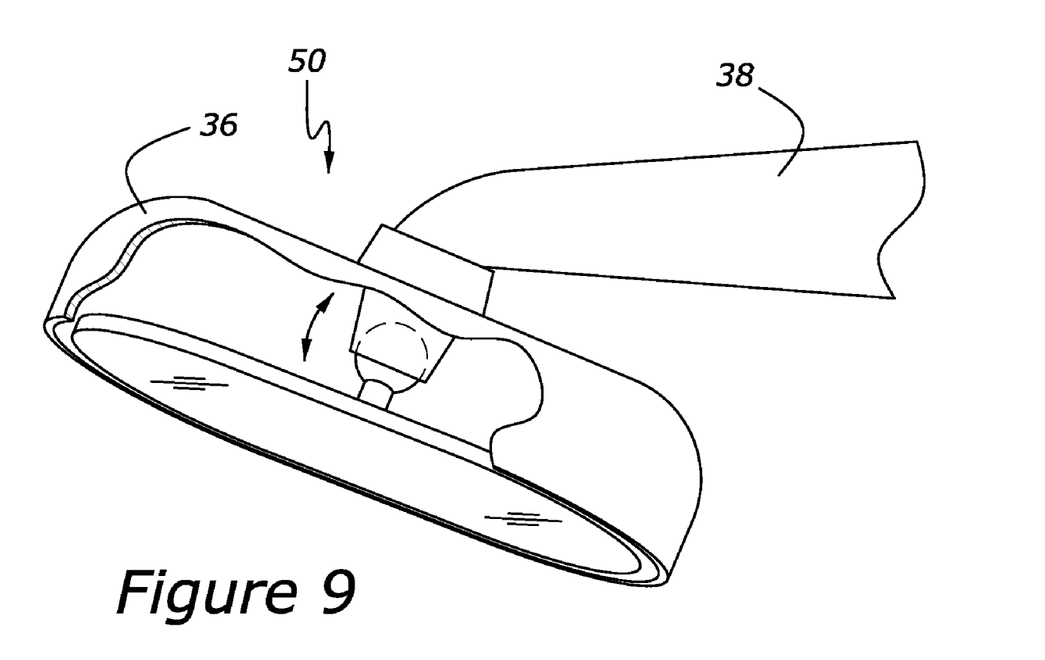

In FIG. 8, an adjusting mechanism 48 is shown that allows the mirror housing 36 to pivot relative to the arm 38. In FIG. 9, an adjusting mechanism 50 is shown in which mirror 30 adjusts with respect to housing 36. The housing 36 does not move with respect to arm 38. These illustrations are provided by way of example and are not intended to be limiting. Any known way of providing for adjustment of the mirror, including, but not limited, to known mechanical and electrically-driven adjustment mechanisms may also be incorporated with this development.

Figure 10:
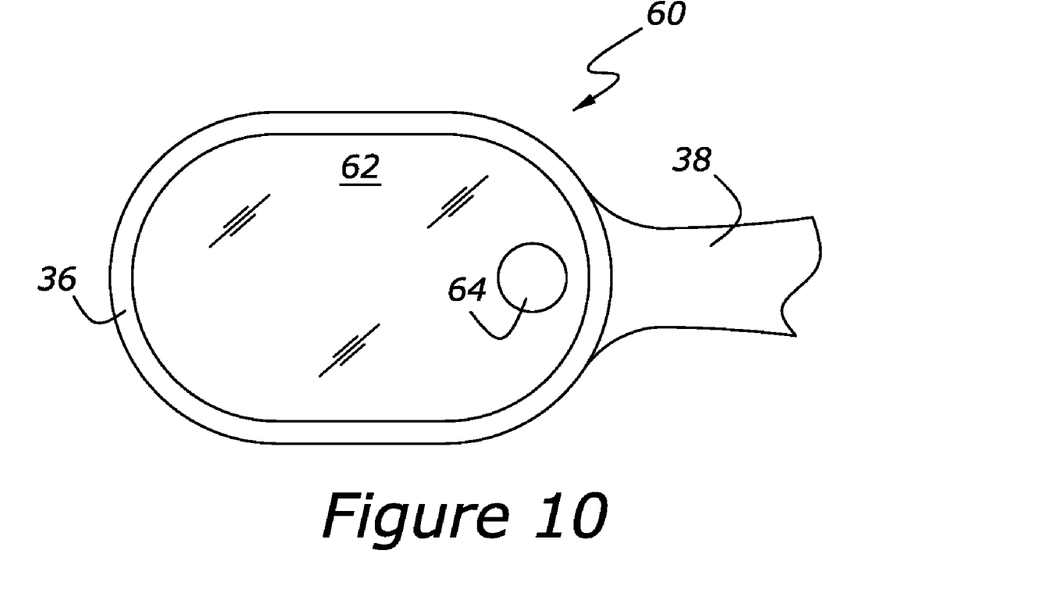
FIG. 10 is a rear elevation view showing a mirror with a facet according to another aspect of the present invention.

In FIG. 10, an alternative embodiment of a mirror assembly 60 shows that a flat surface mirror 62, viewing section, is provided with an inset element 64, alignment section. Alternatively, inset element 64 could be placed proximate the periphery of surface 62.

Figure 11:
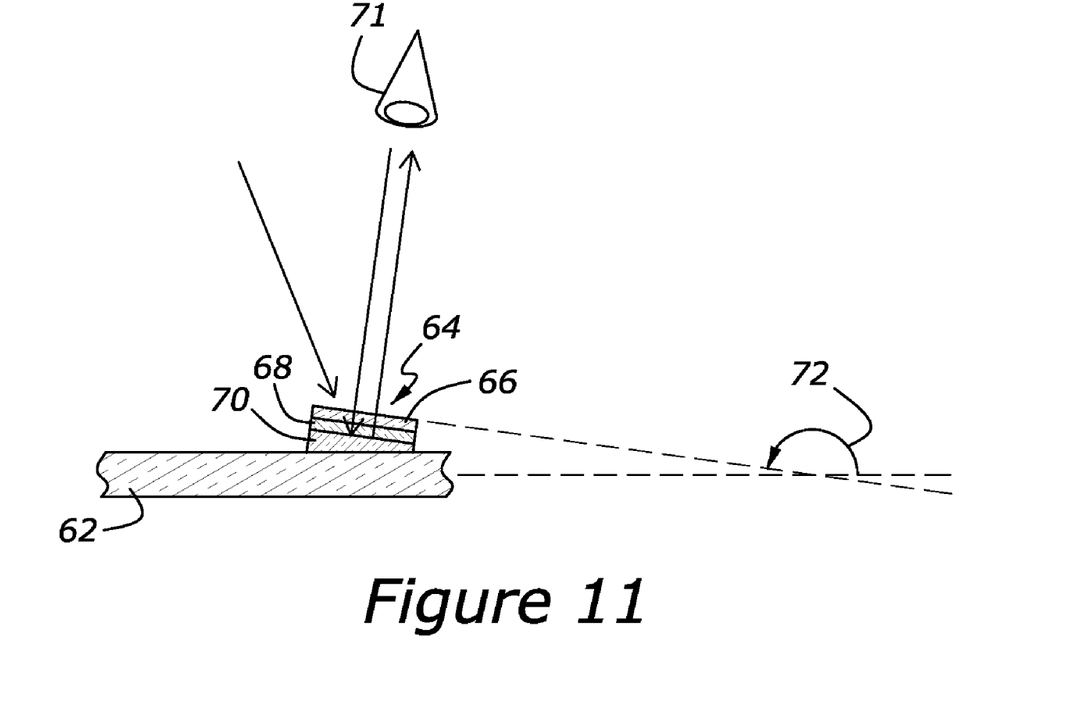
FIG. 11 is a diagrammatic top plan view showing a mirror with a facet according to another aspect of the present invention.
Figure 12:
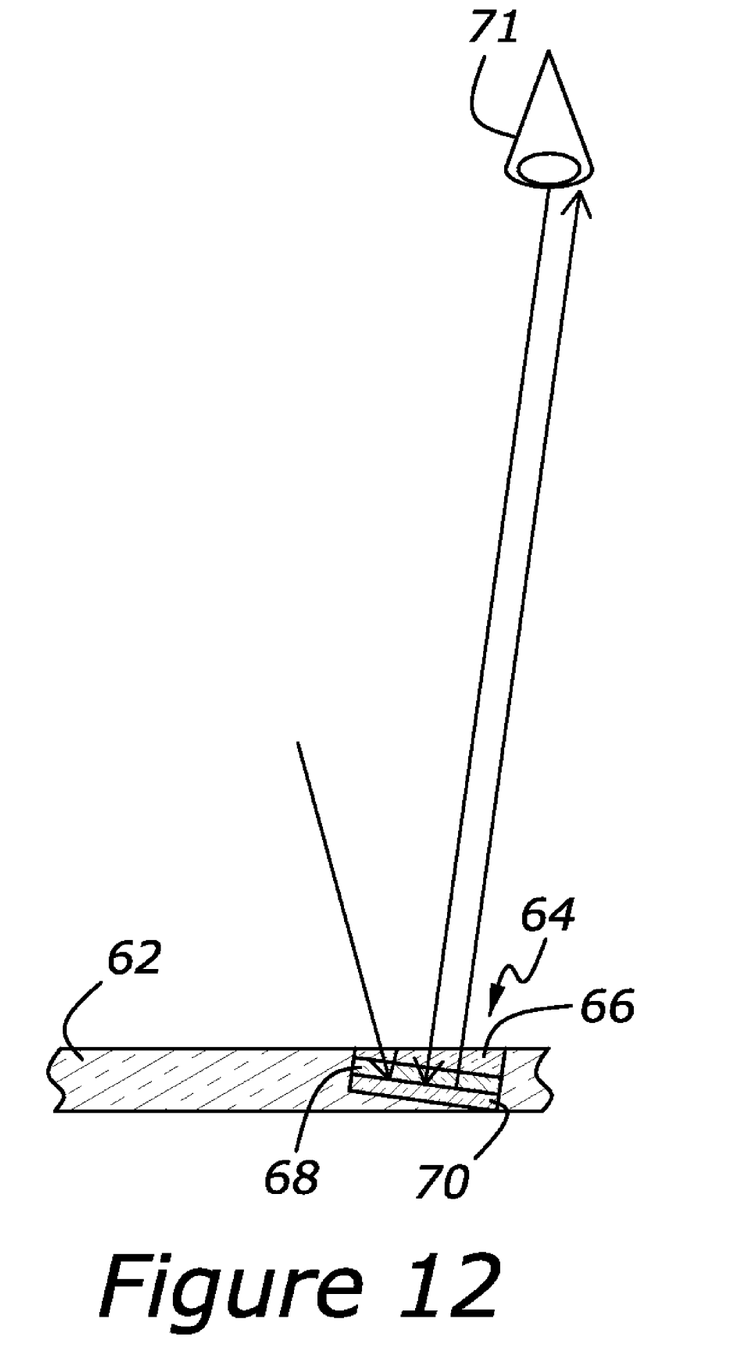
FIG. 12 is a diagrammatic top plan view showing a mirror with a facet according to another aspect of the present invention.

In FIG. 11, element 64 is shown to have 3 layers: a top protective layer 66, a selective acceptance layer 68, and an opaque colored layer 70. The selective acceptance layer 68 transmits only on-axis light, that is, light that is directed normal to the surface of layer 70. Opaque colored layer 70 is a colored layer that the driver of the vehicle is only able to see when the driver's eye 71 is aligned such than an imaginary ray emanating from the eye intersects selective acceptance layer 68 perpendicularly. If the line of sight from the eye is off-axis, selective acceptance layer 68 prevents off-axis light from being transmitted; hence, the driver cannot see opaque colored layer 70. By careful selection of the angle 72 between the face of selective acceptance layer 68 and the face of mirror 62, the driver is able to see opaque colored layer 70 only when mirror 62 is properly aligned. FIG. 11 shows an embodiment in which element 64 is placed on top of mirror 62. In FIG. 12, element 64 is integrated into flat surface mirror 62. In one embodiment, selective acceptance layer 68 is formed out of polarizing material. Such material has a narrow cone of acceptance of light which is transmitted, with non-normal light being absorbed. In another embodiment, selective acceptance layer 68 is made from fiber optic cable. These embodiments are provide by way of example and not intended to be limiting.

In FIG. 11, a top surface of protective layer 66 and bottom surface of protective layer 66 are parallel, but are not parallel as shown in FIG. 12. The shape of protective layer 66 is largely immaterial because light passing through protective layer 66 is largely unaffected. The orientation of selective acceptance layer 68 establishes the reference angle with respect to the mirror 62 that assures proper alignment.

While particular embodiments of the invention have been shown and described, numerous variations and alternate embodiments will occur to those skilled in the art. Accordingly, it is intended that the invention be limited only by the appended claims.

What is claimed is:

1. A mirror system for an automotive vehicle, comprising:
a mirror;
a facet embedded into the mirror and comprising a selective acceptance layer that transmits light in a limited field of view, and a clear, protective layer over the selective acceptance layer, the clear, protective layer being of nonuniform thickness such that an upper surface of the clear, protective layer is substantially coplanar with an upper surface of the mirror.